Jan. 26, 1926.  
F. G. KRUEGER  
SCALE  
Filed May 19, 1921
1,570,967
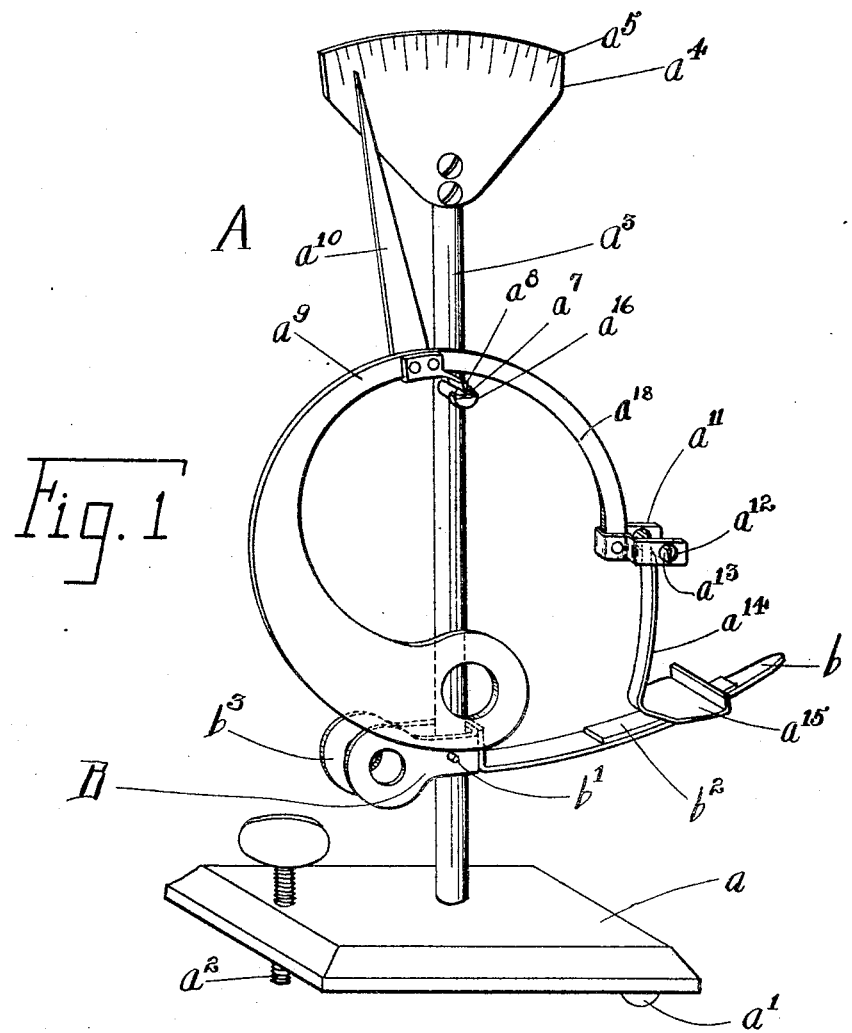
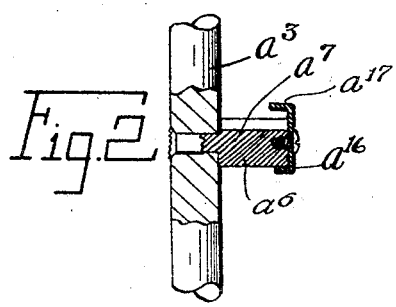
Inventor  
Fred G. Krueger  
By Walter F. Murray  
Attorney Patented Jan. 26, 1926.

1,570,967

UNITED STATES PATENT OFFICE.

FRED G. KRUEGER, OF NORWOOD, OHIO, ASSIGNOR TO THE CINCINNATI STAMPING COMPANY, OF CINCINNATI, OHIO, A CORPORATION OF OHIO.

SCALE.

Application filed May 19, 1921. Serial No. 470,983.

*To all whom it may concern:*

Be it known that I, FRED G. KRUEGER, a citizen of the United States of America, and a resident of Norwood, in the county of Hamilton and State of Ohio, have invented a new and useful Improvement in Scales, of which the following is a specification.

My invention relates to scales to be used primarily in weighing precious metals and stones.

An object of my invention is to provide scales for the purpose stated that will be accurate.

Another object is to provide scales for the purpose stated in which the scale beam or balancing arm is quickly brought to rest without affecting the accuracy of the scales.

Another object is to provide a device wherein the scale beam may be readily adjusted to compensate for the unevenness of a surface upon which the scales may be disposed without affecting the accuracy of the scales registration.

These and other objects are attained by the means described herein and disclosed in the accompanying drawings, in which Fig. 1 is a perspective elevation of scales embodying my invention, parts being broken away.

Fig. 2 is an enlarged view showing partly in section the mounting of the balancing arm forming a detail of my invention.

My invention comprises scales A having a base supported on three points of contact with a given surface upon which the scales may be disposed. Two of the points of contact, such as $a'$, are fixed on the base, and the third point of contact is provided by the thumb screw $a^2$ extending through the base $a$, whereby the one end of the base may be raised and lowered. The adjustable contact is preferably equidistant of the fixed contacts. A standard $a^3$ extends upwardly from the base at substantially the center thereof and has mounted upon its upper end a dial $a^4$ having suitable graduations $a^5$ thereupon. A lug $a^6$ extends from the standard $a^3$ and has formed within it a substantially horizontal seat $a^7$ adapted to accommodate a knife edge contact $a^8$ mounted upon the pendulum $a^9$. The seat $a^7$ and the knife edge $a^8$ extend in a line parallel with a line passing through the fixed points of contacts mounted on the base. The scale beam or pendulum $a^9$ has mounted upon it an indicator $a^{10}$ adapted to be moved across the dial $a^4$ by the moving of the beam about its fulcrum $a^8$, and to register with graduations upon the dial.

One end of the pendulum is curved downwardly and terminates at a place substantially below the fulcrum $a^8$, and constitutes the counterbalance or the weighted arm of the scales. The upper end of the pendulum carries an arm $a^{18}$ which arm has mounted upon it a yoke $a^{11}$ in the branches of which are formed the perforations $a^{12}$. The perforations $a^{12}$ extend through the branches in substantial horizontal alignment and on a line in substantial parallelism with the knife edge contact $a^8$, and have disposed within them the knife edge contacts $a^{13}$ supporting the arm $a^{14}$ upon the lower or free end of which is mounted the receptacle or scale dish $a^{15}$. A cap $a^{16}$ having a flange $a^{17}$ is mounted on the outer or free end of the lug $a^6$, the flange extending over the seat $a^7$ and contact $a^8$. The cap $a^{16}$ prevents unseating of the knife edge contact $a^8$.

A stabilizer B is pivotally mounted upon the standard $a^3$ at a place intermediate the lug $a^6$ and the base $a$, and comprises a buffer arm $b$ extending outwardly from the pivotal mounting $b'$ of the stabilizer to a distance beyond the scale dish $a^{15}$. A buffer pad $b^2$ is mounted on the arm $b$ and is yieldingly retained in contact with the receptacle $a^{15}$ by the counterweight $b^3$ extending on the opposite side of the pivotal mounting $b'$ from the buffer arm. The counterweight is slightly heavier than the combined buffer arm and pad.

The operation of my device is as follows:

With the buffer pad $b^2$ disengaged with the pan $a^{15}$, the thumb screw $a^2$ is adjusted until the indicator registers with a given graduation. When an article is then placed in the receptacle, the weight of the article causes the scale beam to move about its mounting, and the stabilizer checks the vibration of the scale beam. When the scale beam has ceased to vibrate, the operator then disengages the stabilizer from the receptacle and the accurate net weight of the article is then designated by the indicator.

What I claim is:

1. The combination of a base, two fixed contacts upon the base, a vertically adjustable contact spaced equidistant from the fixed contacts, a standard mounted vertically upon the base, a lug mounted on the standard, there being a seat formed on the lug extending in parallelism with a line extending between corresponding points of the fixed contacts, a dial on the standard, a pendulum, a knife edge on the pendulum adapted to bear on the seat on the lug, and an indicator on the pendulum adapted to register with the dial.

2. The combination of a base, two fixed contacts upon the base, a vertically adjustable contact spaced equidistant from the fixed contacts, a standard mounted vertically upon the base, a lug mounted on the standard, there being a seat formed on the lug extending in parallelism with a line extending between corresponding points of the fixed contacts, a dial on the standard, a pendulum, a knife edge on the pendulum adapted to bear on the seat on the lug, an indicator on the pendulum adapted to register with the dial, a yoke mounted on one end of the pendulum having bores in the branches thereof, the common axis of the bores being in parallelism with the said knife edge, a second knife edge disposed within the bores, and a receptacle suspended from the second knife edge.

3. The combination of a base, two fixed contacts upon the base, a vertically adjustable contact spaced equidistant from the fixed contacts, a standard mounted vertically upon the base, a lug mounted on the standard, there being a seat formed on the lug extending in parallelism with a line extending between corresponding points of the fixed contacts, a dial on the standard, a pendulum, a knife edge on the pendulum adapted to bear on the seat on the lug, an indicator on the pendulum adapted to register with the dial, a yoke mounted on one end of the pendulum having bores in the branches thereof, the common axis of the bores being in parallelism with the said knife edge, a second knife edge disposed within the bores, a receptacle suspended from the second knife edge, and a stabilizer pivotally mounted on the standard and being adapted to contact with the pan for resisting vibration of the receptacle, the adjustable contact being adapted to incline the standard for effecting accurate registration of the indicator and the dial.

4. The combination with scales comprising a pendulum and a scale pan suspended therefrom, of a stabilizer comprising a counterweighted buffer arm pivotally mounted below, free and independent of the pendulum, and a buffer pad mounted on the buffer arm adapted to be retained in yielding engagement against the scale pan by the counterweight of the stabilizer, the buffer arm being capable of movement about its pivotal mounting whereby to disengage the buffer arm and the scale pan.

5. In scales the combination of a standard, a dial supported by the standard, a support lug upon the standard, a curved pendulum having intermediate its ends a knife edge balanced upon the support lug, a weighted end below the support lug and a yoke at its opposite end, a pan having an arm with a knife edge engaging the yoke, an indicator mounted on the pendulum registering with the dial, and a stabilizer pivotally mounted on the standard below the pendulum free and independent of the pendulum, and yieldingly engaging the scale pan, the stabilizer being capable of movement about its pivotal mounting whereby to disengage the stabilizer and the scale pan.

In testimony whereof, I have hereunto subscribed my name this 16th day of May, 1921.

FRED G. KRUEGER.